United States Patent [19]

Rojstaczer et al.

[11] Patent Number: 5,317,049

[45] Date of Patent: May 31, 1994

[54] POLYIMIDESILOXANE SOLUTION AND METHOD OF COATING SUBSTRATES

[75] Inventors: Sergio R. Rojstaczer, Amherst; David Y. Tang, E. Amherst; John A. Tyrell, Williamsville, all of N.Y.

[73] Assignee: Occidental Chemical Corporation, Niagara Falls, N.Y.

[21] Appl. No.: 78,339

[22] Filed: Jun. 21, 1993

[51] Int. Cl.$^5$ .......................................... C08K 5/3415
[52] U.S. Cl. .................................. 524/104; 524/600; 524/588; 428/447
[58] Field of Search ............... 428/447; 524/104, 600, 524/588

[56] References Cited

U.S. PATENT DOCUMENTS

| | | | |
|---|---|---|---|
| 4,624,978 | 11/1986 | Frayer | 525/104 |
| 4,639,485 | 1/1987 | Frayer | 524/378 |
| 4,956,451 | 9/1990 | Eisenbraun et al. | 528/353 |
| 4,973,645 | 11/1990 | Lee | 528/26 |
| 4,996,254 | 2/1991 | Eisenbraun et al. | 524/104 |
| 5,068,131 | 11/1991 | Eisenbraun et al. | 427/240 |

FOREIGN PATENT DOCUMENTS

| | | |
|---|---|---|
| 148719A1 | 7/1985 | European Pat. Off. . |
| 363737A2 | 4/1990 | European Pat. Off. . |
| 3507790A1 | 9/1985 | Fed. Rep. of Germany . |
| 83-76689 | 11/1984 | Japan . |

OTHER PUBLICATIONS

T. H. Yoon et al., 35th International SAMPE Symposium, Apr. 2–5, 1990, titled "Effect of Molecular Weight And End Group Control On The Adhesion Behavior of Thermoplastic Polyimides And Poly(Imide Siloxane) Segmented Copolymers."

*Primary Examiner*—Melvyn I. Marquis
*Assistant Examiner*—Margaret W. Glass
*Attorney, Agent, or Firm*—Wayne A. Jones; Richard D. Fuerle

[57] ABSTRACT

Disclosed is a solution which comprises
 (a) a substantially fully imidized polyimidesiloxane; and
 (b) a solvent which comprises at least 50 wt % of a substituted pyrrolidone having the general formula

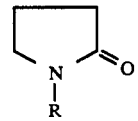

where R is aliphatic or cycloaliphatic from $C_3$ to $C_{10}$.

Also disclosed is a method of forming a coating on a substrate by applying the solution to the substrate and evaporating the solvent. Coatings formed from this solution are not subject to whitening as are coatings formed from the same polymers in other solvents.

20 Claims, No Drawings

POLYIMIDESILOXANE SOLUTION AND METHOD OF COATING SUBSTRATES

BACKGROUND OF THE INVENTION

This invention relates to a solution of a substantially fully-imidized polyimidesiloxane in a substituted pyrrolidone solvent and to a method of coating substrates. In particular, it relates to solutions of polyimidesiloxanes in solvents containing N-cyclohexyl pyrrolidone (CHP), which do not develop a white crust when the solution is applied.

A coating of a polymer can be made by dissolving the polymer in a solvent, spreading the solution over a substrate, and evaporating the solvent. When solutions of certain polymers in some solvents are spread and the solvent is evaporated, an objectionable white crust is formed. The whitening of the coating is a problem because it affects the flow characteristics of the solution in such a way that it sometimes does not uniformly coat the substrate.

For example, solutions of polyamic acids or polyimides in N-methylpyrrolidone (NMP) can develop this problem. The problem has been overcome for particular polyamic acids or polyimides by mixing the NMP with various co-solvents such as cyclohexanone (EP Application 364791 A2), tetramethylbenzene (EP Application 363737 A2), and butyl cellosolve acetate (Japanese Application 83-76689). While those solutions to the problem may be adequate for the particular polyimide being coated, they are not adequate for polyimidesiloxanes, because polyimidesiloxanes are less soluble than polyamic acids and may not dissolve in those mixtures of solvents. Also, whitening could still occur and there may be other reasons for not using those particular solvents. Until now a general solvent system for polyimidesiloxanes that does not produce whitening when a coating is formed has not been found.

SUMMARY OF THE INVENTION

We have discovered that if polyimidesiloxanes are dissolved in certain particular derivatives of pyrrolidone, coatings formed from the solution do not undergo whitening. The solvent system of this invention can be evaporated at temperatures low enough to prevent damage to most substrates. Also, although substantially fully imidized polyimidesiloxanes are insoluble in many solvents, they are nevertheless soluble in the solvent system of this invention.

Another advantage of the solvents used in this invention is that a large variety of polyimidesiloxanes are soluble in them that are not soluble in other solvents. Also, we have found that if a solution of a polyimidesiloxane in some solvents is permitted to stand for a long period of time, the polyimidesiloxane may gel or precipitate. However, that problem does not seem to occur with the solvents of this invention.

While solutions of many polyimidesiloxanes in NMP will produce coatings that whiten after the solution has been exposed to humid air for only 10 to 20 minutes, coatings made from solutions of polyimidesiloxanes in CHP do not whiten even if the solution has been exposed to moist air for more than 24 hours.

DESCRIPTION OF THE INVENTION

Almost any polyimidesiloxanes can be used in forming the solution of this invention. Polyimidesiloxanes can be formed by reacting a dianhydride with a diamine, where either a portion of the dianhydride or a portion of the diamine (or a portion of both) contains siloxane groups. That is, one uses either a dianhydride, a non-siloxane containing diamine, and a siloxane containing diamine, or one uses a dianhydride, a non-siloxane containing diamine, and a siloxane containing dianhydride. It is preferable to use siloxane containing diamines as they are more available and have good properties.

The siloxane-containing compounds may be either aromatic or non-aromatic, but non-aromatic compounds are preferred as they are more readily available. Examples of siloxane diamines that can be used include compounds having the formula

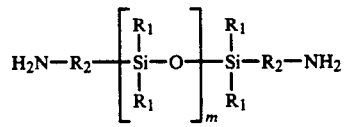

Examples of siloxane dianhydrides that can be used include compounds having the formula

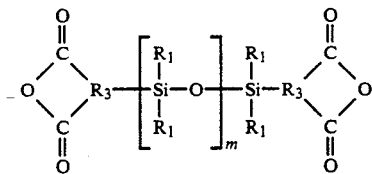

where $R_1$, $R_2$, and $R_3$ are mono, di, and triradicals, respectively, each independently selected from a substituted or unsubstituted 1 to 12 carbon atom aliphatic group or a substituted or unsubstituted 6 to 10 carbon atom aromatic group, and m is 1 to 200 and is preferably 1 to 12. (Siloxane diamines are herein denoted by the notation "$G_m$".) Examples of monoradicals include —$CH_3$, —$CF_3$, —CH=$CH_2$, —$(CH_2)_nCF_3$, —$C_6H_5$, —$CF_2$—CHF—$CF_3$, and

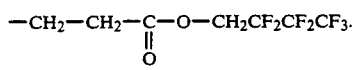

Examples of diradicals include —$(CH_2)_n$—, —$(CH_2)_n$—, —$CF_2$— and —$C_6H_4$—, where n is 1 to 10. Examples of triradicals include

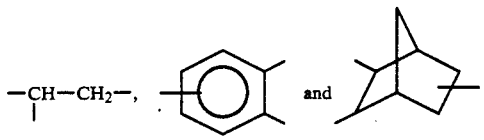

Any dianhydride can be used in forming the polyimidesiloxane, although aromatic dianhydrides are preferred as they give superior properties. Examples of suitable dianhydrides include
1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;

2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BDTA);
2,2',3,3'-biphenyl tetracarboxylic dianhydride;
2,3,3',4'-biphenyl tetracarboxylic dianhydride;
3,3',4,4'-biphenyl tetracarboxylic dianhydride (BPDA);
bicyclo-[2,2,2]-octen-(7)-2,3,5,6-tetracarboxylic-2,3,5,6-dianhydride;
thio-diphthalic anhydride;
bis (3,4-dicarboxyphenyl) sulfone dianhydride;
bis (3,4-dicarboxyphenyl) sulfoxide dianhydride;
bis (3,4-dicarboxyphenyl) oxadiazole-1,3,4) paraphenylene dianhydride;
bis (3,4-dicarboxyphenyl) 2,5-oxadiazole 1,3,4-dianhydride;
bis 2,5-(3',4'-dicarboxydiphenylether) 1,3,4-oxadiazole dianhydride;
bis (3,4-dicarboxyphenyl) ether dianhydride or oxydiphthalic anhydride (ODPA);
bis (3,4-dicarboxyphenyl) thioether dianhydride;
bisphenol A dianhydride;
bisphenol S dianhydride;
2,2-bis (3,4-dicarboxyphenyl) hexafluoropropane dianhydride or 5,5-[2,2,2-trifluoro-1-(trifluoromethyl)ethylidene]bis-1,3-isobenzofurandione) (6FDA);
hydroquinone bisether dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride; and
resorcinol dianhydride.

The anhydrides can be used in their tetraacid form or as mono, di, tri, or tetra esters of the tetra acid, but the dianhydride form is preferred because it is more reactive.

The preferred dianhydrides are ODPA, BPDA, BTDA, 6FDA, and PMDA or mixtures thereof, as these dianhydrides are readily available and have been found to give superior properties. The most preferred dianhydride is ODPA because it gives a polyimidesiloxane having better adhesion and good flexibility.

The non-siloxane containing diamine should be aromatic as those diamines give the best properties. Examples of suitable aromatic diamines include
m- and -p-phenylenediamine;
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline (ODA);
3,4'-oxydianiline;
4,4'-diaminobenzophenone;
3,3', 3,4', or 4,4'-diaminophenyl sulfone or m,m-, m,p- or p,p-sulfone dianiline;
4,4'-diaminodiphenyl sulfide;
3,3' or 4,4'-diaminodiphenylmethane or m,m- or p,p-methylene dianiline;
3,3'-dimethylbenzidine;
4,4'-isopropylidenedianiline;
1,4-bis(p-aminophenoxy)benzene;
4,4'-bis(4-aminophenoxyl)biphenyl;
1,3-bis(4-aminophenoxy)benzene;
1,3-bis(3-aminophenoxy)benzene (APB);
2,4-diamino-5-chlorotoluene;
2,4-diamino-6-chlorotoluene;
2,2-bis(4[4-aminophenoxy]phenyl) propane (BAPP);
trifluoromethyl-2,4-diaminobenzene;
trifluoromethyl-3,5-diaminobenzene;
2,2'-bis(4-aminophenyl)-hexafluoropropane;
2,2'-bis(4-phenoxy aniline) isopropylidene;
2,4,6-trimethyl-1,3-diaminobenzene;
4,4'-diamino-2,2'-trifluoromethyl diphenyloxide;
3,3'-diamino-5,5'-trifluoromethyl diphenyloxide;
2,4,6-trimethyl-1,3-diaminobenzene;
diaminoanthraquinone;
4,4'-oxybis[2-trifluoromethyl)benzeneamine](1,2,4-OBABTF);
4,4'-oxybis[(3-trifluoromethyl)benzeneamine];
4,4'-thiobis[(2-trifluoromethyl)benzeneamine];
4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine];
4,4'-[(2,2,2-trifluoromethyl-1-(trifluoromethyl)ethylidine)bis(3-trifluoromethyl)benzeneamine];
4,4'-dimethylsilylbis[(3-trifluoromethyl)benzeneamine].

The preferred aromatic diamines are TDA, APB and BAPP due to their excellent properties. A particularly preferred polyimidesiloxane is made from ODPA, APB, and G9 in NMP.

The polyimidesiloxanes can be made from about 1 to about 80 wt % siloxane containing monomers and about 20 to about 99 wt % monomers that do not contain siloxanes. However, this invention is particularly applicable to polyimidesiloxanes that contain about 1 to about 30 wt % siloxane monomer as those polyimidesiloxanes tend to be less soluble and so there are fewer other ways to solve the whitening problem. Generally, stoichiometric quantities of diamine and dianhydride are used to obtain the highest molecular weight polyimidesiloxane, but the equivalent ratio of diamine to dianhydride can range from 1:2 to 2:1.

The polyimidesiloxanes are typically prepared in solution. Suitable solvents depend upon the particular composition of the polyimidesiloxane that is to be made, but can include N-methylpyrrolidone (NMP), which is preferred, diglyme, triglyme, dimethylacetamide, cyclic ketones such as cyclohexanone and cyclopentanone, and mixtures thereof. The solution can be any percent solids desired, but it is preferably about 10 to about 30 wt % solids as more dilute solutions mean more solvent to remove and more concentrated solutions are too viscous.

The first reaction, which forms the polyamic acid, occurs at room temperature and the second reaction, which closes the imide ring, occurs at a temperature of about 150° to about 180° C. Typically, the reaction mixture is refluxed several hours to imidize the polymer. The polyimidesiloxanes used in this invention are substantially fully imidized, which means that at least 90%, and preferably at least 95% of the imide rings that can be formed are formed. A substantially fully imidized polyimidesiloxane is desired so that it is not necessary to heat a substrate coated with a polyamic acid in order to close the imide ring. A more complete description of the preparation of solvent-soluble substantially fully imidized thermoplastic adhesive polyimidesiloxanes can be found in U.S. Pat. No. 4,973,645, herein incorporated by reference.

Once the substantially fully imidized polyimidesiloxane has been formed it is isolated. Isolation can be accomplished by evaporation of the solvent. However, isolation is preferably accomplished by the addition of the solution to water to precipitate the polyimidesiloxane, which is collected, washed with water, and dried. The solution of this invention is made by dissolving the polyimidesiloxane in a substituted pyrrolidone solvent. The solvent has the formula

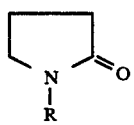

where R is aliphatic or cycloaliphatic from $C_3$ to $C_{10}$ and is preferably alkyl or cycloalkyl from $C_3$ to $C_{10}$. Examples of R groups include propyl, isopropyl, butyl, isobutyl, amyl, hexyl, octyl, nonyl, decyl, 2-ethylhexyl, and cyclohexyl. Preferably, R is cyclohexyl which forms the compound N-cyclohexyl pyrrolidone (CHP) as CHP is readily available, dissolves most substantially fully imidized polyimidesiloxanes, and produces coatings that do not whiten.

While the solvent used to form the coating solution is preferably the pure substituted pyrrolidone, it may be desirable under certain circumstances to add a co-solvent to the solution in order to obtain certain properties. For example, if rapid evaporation of the solution is desired so that the solution does not run before the coating solidifies, the addition of a co-solvent may increase the evaporation rate. While the co-solvent need not dissolve the polyimidesiloxane, the mixture of the solvent with the co-solvent must dissolve the polyimidesiloxane. The co-solvent should have a boiling point of about 50° to about 210° C. and it is typically organic and has a lower boiling point than the substituted pyrrolidone solvent. Examples of suitable co-solvents include NMP, diglyme, triglyme, xylene, mesitylene, and cycloaliphatic ketones such as cyclohexanone or cyclopentanone. The solvent mixture must be at least 50 wt % substituted pyrrolidone in order to prevent whitening of the coating and preferably at least 90 wt % of the mixed solvent is the substituted pyrrolidone. Generally, at least about 1 wt % co-solvent is needed to affect the properties of the solution.

The solution can also contain certain optional ingredients such as thixotropes, defoamers and stabilizers. The solids content of the solution should be about 5 to about 50 wt % solids as it is difficult to make thick coatings if the solution is less than 5 wt % solids and solutions of more than 50 wt % solids are too viscous to handle easily. Preferably, the solution is about 15 to about 30 wt % solids. A coating can be formed on a computer chip in order to protect the chip from moisture, contaminants, mechanical damage and alpha particles or act as a buffer between the chip and encapsulant. Coatings can also be formed on metal lead frames, metals, ceramics and plastics such as polyimide film in order to make an adhesive tape. The coating can be applied by any known coating method such a flow dispensing, spin coating, dipping and spraying. The thickness of the coating is determined by the percent solids and the coating method used. Typically, the coating will have a thickness of about 3 to about 200μ. Once the solution is applied to the substrate the solution is heated, typically to a temperature of 220° to about 260° C., to evaporate the solvent and form the coating.

The following examples further illustrate this invention.

EXAMPLE 1

To a dry 12 liter 3 neck flask equipped with overhead stirrer, thermometer, Dean-Stark trap, and nitrogen inlet on top of the condenser was added 5 liters dry NMP and 750 ml toluene. To this flask, with stirring, was added 346.9 g (1.18 moles) BDPA and then 910.6 g (0.822 mole of siloxane diamine with average molecular weight=1108) $G_{12}$. The reaction mixture was stirred for four hours and 42.5 g (0.348 moles) of TDA was added. The reaction was stirred overnight and, the next day, 250 ml of NMP and 18 g 2,2,2-diazabicyclooctane (DABCO) catalyst were added. The reaction was heated to reflux and water was removed. The reflux was maintained for 4 hours with the pot temperature gradually increasing from about 155° C. to about 172° C. About 120 cc of an aqueous phase was removed during this period. After this time, vacuum was applied to remove about 35-40% of the solvent. The reaction mixture was cooled to about 80° C. and precipitated into water. The mixture was filtered, washed, reslurried in deionized water and refiltered. The precipitate was then dried at 105° C. for three days.

EXAMPLES 2-4

Example 1 was repeated using different monomers. The following table summarizes the preparation of these polyimidesiloxanes:

| Example | Dianhydride | Diamine | Siloxane Diamine |
|---|---|---|---|
| 1 | 346.9 g BPDA | 42.5 g TDA | 911 g $G_{12}$ (Mw = 1108) |
| 2 | 438.5 g ODPA | 402.8 g BAPP | 360 g $G_9$ (Mw = 841) |
| 3 | 83.76 g ODPA +39.8 g 6FDA | 36.6 g TDA | 36 g $G_9$ (Mw = 841) |
| 4 | 1933 g BTDA | 610.7 g TDA | 845 g $G_9$ (Mw = 841) |

EXAMPLE 5

Three solutions of each of the polyimidesiloxanes of Examples 1-4 were prepared by adding 1.5 g of polymer to 8.5 g of each of the following solvent systems: N-methyl pyrrolidone (NMP), N-cyclohexyl pyrrolidone (CHP) and a 80/20 mixture of CHP/NMP. After all the polymer was dissolved by placing the polymer/solvent mixtures on a mechanical rotator overnight, clear solutions were obtained. Drops of each solution were dispensed onto a glass plate. The room temperature was 21° F. and the relative humidity 58%. The optical appearance was checked after 15 min., 1 hr., 3 hr. and 19 hrs. after dispensing the polymer. The results are listed in the following table:

| Solvent | NMP | | | | NMP/CHP 20/80 | | | | CHP | | | |
|---|---|---|---|---|---|---|---|---|---|---|---|---|
| Polymer | 1 | 2 | 3 | 4 | 1 | 2 | 3 | 4 | 1 | 2 | 3 | 4 |
| 15 min. | w | w | w | w | c | c | c | c | c | c | c | c |
| 1 hr. | w | w | w | w | c | c | w | w | c | c | c | c |
| 3 hr. | w | w | w | w | c | c | w | w | c | c | c | c |

| Solvent | NMP | | | | NMP/CHP 20/80 | | | | CHP | | | |
| --- | --- | --- | --- | --- | --- | --- | --- | --- | --- | --- | --- | --- |
| Polymer | 1 | 2 | 3 | 4 | 1 | 2 | 3 | 4 | 1 | 2 | 3 | 4 |
| 19 hr. | w | w | w | w | c | c | w | w | c | c | c | c |

EXAMPLE 6 (COMPARATIVE)

A 15 wt % solution of the polymer of Example 4 was prepared in N-ethyl pyrrolidone. This solution was found to whiten after 15 minutes.

EXAMPLE 7

A 15 wt % solution of the polymer of Example 4 was prepared in N-octyl pyrrolidone. This solution was clear 15 min., 1 hr., 3 hrs and 19 hrs.

We claim:

1. A solution of about 5 to about 50 wt. % solids comprising
   (A) a substantially fully imidized polyimidesiloxane; and
   (B) a solvent which comprises at least 50 wt %, based on solvent weight, of a liquid substituted pyrrolidone having the formula

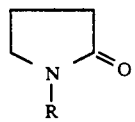

where R is aliphatic or cycloaliphatic from $C_3$ to $C_{10}$.

2. A solution according to claim 1 wherein R is alkyl or cycloalkyl from $C_3$ to $C_{10}$.

3. A solution according to claim 1 wherein said liquid is N-cyclohexyl pyrrolidone.

4. A solution according to claim 1 wherein said polyimidesiloxane is made from a diamine that does not contain a siloxane group, a diamine that contains at least one siloxane group, and a dianhydride.

5. A solution according to claim 4 wherein said diamine that does not contain a siloxane group is selected from the group consisting of 2,4-diaminotoluene, 1,3-bis(3-aminophenoxy)benzene, and 2,2-bis(4[4-aminophenoxy]phenyl)propane.

6. A solution according to claim 4 wherein said dianhydride is selected from the group consisting of oxydiphthalic anhydride, 3,3′,4,4′-biphenyl tetracarboxylic dianhydride, 3,3′,4,4′-benzophenone tetracarboxylic dianhydride, 2,2-bis(3,4-dicarboxyphenyl)hexafluoropropane dianhydride, and pyromellitic dianhydride.

7. A solution according to claim 4 wherein said diamine that contains a siloxane group has the general formula

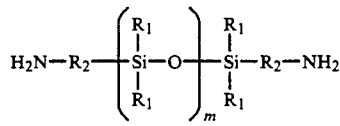

where $R_1$ and $R_2$ are mono-or di-radicals, respectively, each independently selected from a substituted or unsubstituted 1 to 12 carbon atom aliphatic group or a substituted or unsubstituted 6 to 10 carbon atom aromatic group, and m is 1 to 200.

8. A solution according to claim 4 wherein the diamine that contains a siloxane group is about 1 to about 30 wt % of the total polyimidesiloxane weight.

9. A solution according to claim 1 wherein said polyimidesiloxane is at least 95% imidized.

10. A solution according to claim 1 wherein said solvent comprises at least 90 wt % of said liquid substituted pyrrolidone.

11. A solution comprising
    (A) about 5 to about 50 wt % of a polyimidesiloxane that is at least 90% imidized, which comprises the reaction product of an aromatic dianhydride with an aromatic diamine that does not contain siloxane groups and an aliphatic diamine that contains siloxane groups, where said aliphatic diamine comprises about 1 to about 30 wt % of said polyimidesiloxane weight; and
    (B) about 50 to about 95 wt % of a solvent which comprises
    (1) at least about 90 wt %, based on solvent weight, of a liquid substituted pyrrolidone having the formula

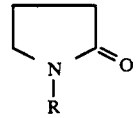

where R is alkyl or cycloalkyl from $C_3$ to $C_{10}$; and
    (2) up to about 10 wt %, based on solvent weight, of an organic co-solvent having a boiling point of about 50° to about 210° C.

12. A solution according to claim 11 wherein said solvent comprises about 9 to about 99 wt % of said liquid substituted pyrrolidone and about 1 to about 10 wt % of said organic co-solvent.

13. A solution according to claim 12 wherein said organic co-solvent is N-methylpyrrolidone.

14. A solution according to claim 11 wherein said substituted pyrrolidone is 100 wt % of said solvent.

15. A solution according to claim 11 wherein said solution is about 15 to about 30 wt % solids.

16. A solution consisting essentially of
    (A) about 5 to about 50 wt % of a polyimidesiloxane that is at least 95% imidized; and
    (B) about 50 to about 95 wt % N-cyclohexyl pyrrolidone.

17. A method of forming a coating on a substrate comprising applying a solution according to claim 1 over said substrate and evaporating said solvent.

18. A method according to claim 17 wherein said substrate is a computer chip.

19. A method according to claim 17 wherein said substrate is a polyimide film.

20. A substrate coated with a solution according to claim 1.

* * * * *